United States Patent
Lu et al.

(12) 
(10) Patent No.: US 9,026,910 B2
(45) Date of Patent: May 5, 2015

(54) DYNAMIC HELP INFORMATION

(75) Inventors: Xu Qing Lu, Beijing (CN); Yao Qi, Beijing (CN); Xing Xing Shen, Beijing (CN); Chuang Tang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 12/954,997

(22) Filed: Nov. 29, 2010

(65) Prior Publication Data

US 2011/0131491 A1    Jun. 2, 2011

(30) Foreign Application Priority Data

Nov. 30, 2009 (CN) .......................... 2009 1 0247122

(51) Int. Cl.
  *G06F 3/00* (2006.01)
  *G06F 3/048* (2013.01)
  *G06F 17/30* (2006.01)
  (Continued)

(52) U.S. Cl.
  CPC .... *G06F 17/30899* (2013.01); *G06F 17/30728* (2013.01); *G06F 3/04895* (2013.01); *G06F 3/04812* (2013.01); *G06F 17/30873* (2013.01); *G06F 9/4446* (2013.01)

(58) Field of Classification Search
  CPC .................... G06F 17/30728; G06F 17/30873; G06F 17/3089; G06F 17/30899; G06F 9/4443; G06F 9/4446; G06F 8/65; G06F 11/2257; G06F 3/011; G06F 3/1454; G06F 3/0481; G06F 3/04812; G06F 3/0482; G06F 3/0489; G06F 3/04895; G06Q 10/109; G01C 21/36; G01C 21/3632; G01C 21/367; B64G 1/22

USPC ................... 715/708, 710–714, 760
  See application file for complete search history.

(56) References Cited

U.S. PATENT DOCUMENTS 5,049,929 A * 9/1991 Anderson et al. ............... 399/82
5,239,617 A * 8/1993 Gardner et al. ................ 706/11

(Continued)

FOREIGN PATENT DOCUMENTS

| CN | 1746883 A | 3/2006 |
| CN | 101216747 A | 7/2008 |
| CN | 101576822 A | 11/2009 |

OTHER PUBLICATIONS

HTML 4.0 Specification, World Wide Web Consortium, Apr. 24, 1998.*

(Continued)

*Primary Examiner* — Eric J Bycer
(74) *Attorney, Agent, or Firm* — Thomas E. Lees, LLC

(57) ABSTRACT

Dynamic help information is provided by receiving unit, configured to receive at least one operation of a user and to obtain the user's operation history, where the operation history includes at least one operation; a determining unit, configured to determine the corresponding help information according to the user's operation history; and an information obtaining unit, configured to obtain said corresponding help information. Assistance in providing help information is also provided, comprising: an operation capturing unit, configured to capture and send at least one operation of a user; and an information displaying unit, configured to receive and display the help information corresponding to the user's operation history, where the operation history includes at least one operation. With the apparatuses and method of this invention, the pertinent help information can be dynamically provided for users according to user's operation history.

23 Claims, 14 Drawing Sheets

(51) Int. Cl.
*G06F 9/44* (2006.01)
*G06F 3/0489* (2013.01)
*G06F 3/0481* (2013.01)

(56) References Cited

U.S. PATENT DOCUMENTS

| | | | | |
|---|---|---|---|---|
| 5,933,140 | A * | 8/1999 | Strahorn et al. | 715/712 |
| 6,052,730 | A * | 4/2000 | Felciano et al. | 709/225 |
| 6,307,544 | B1 * | 10/2001 | Harding | 715/709 |
| 6,307,554 | B1 | 10/2001 | Harding | |
| 6,339,436 | B1 | 1/2002 | Amro et al. | |
| 6,560,616 | B1 * | 5/2003 | Garber | 1/1 |
| 6,882,825 | B2 | 4/2005 | Hopkins et al. | |
| 6,918,212 | B1 * | 7/2005 | Anderson, Sr. | 52/506.05 |
| 6,920,612 | B2 * | 7/2005 | Makinen | 715/705 |
| 6,959,294 | B2 | 10/2005 | Sullivan et al. | |
| 6,981,212 | B1 | 12/2005 | Claussen et al. | |
| 7,080,321 | B2 | 7/2006 | Aleksander et al. | |
| 7,487,201 | B1 * | 2/2009 | Murray et al. | 709/201 |
| 7,533,339 | B2 | 5/2009 | Wadhwa | |
| 7,568,002 | B1 | 7/2009 | Vacanti et al. | |
| 7,594,176 | B1 | 9/2009 | English | |
| 7,849,405 | B1 * | 12/2010 | Coletta et al. | 715/708 |
| 7,865,828 | B1 * | 1/2011 | Hanson et al. | 715/705 |
| 8,073,590 | B1 * | 12/2011 | Zilka | 701/36 |
| 8,234,562 | B1 * | 7/2012 | Evans et al. | 715/224 |
| 2002/0015056 | A1 * | 2/2002 | Weinlaender | 345/705 |
| 2002/0130895 | A1 | 9/2002 | Brandt et al. | |
| 2002/0147757 | A1 * | 10/2002 | Day et al. | 709/1 |
| 2003/0001875 | A1 * | 1/2003 | Black et al. | 345/708 |
| 2003/0084115 | A1 * | 5/2003 | Wood et al. | 709/217 |
| 2004/0051891 | A1 * | 3/2004 | Moro et al. | 358/1.9 |
| 2004/0059966 | A1 * | 3/2004 | Chan et al. | 714/48 |
| 2004/0268229 | A1 * | 12/2004 | Paoli et al. | 715/508 |
| 2005/0022116 | A1 * | 1/2005 | Bowman et al. | 715/513 |
| 2006/0015817 | A1 * | 1/2006 | Fioretti et al. | 715/765 |
| 2006/0026531 | A1 * | 2/2006 | Lin et al. | 715/809 |
| 2006/0048074 | A1 * | 3/2006 | Klein | 715/811 |
| 2006/0123390 | A1 * | 6/2006 | Chan et al. | 717/115 |
| 2006/0236236 | A1 * | 10/2006 | Wilbrink et al. | 715/530 |
| 2007/0011340 | A1 * | 1/2007 | Seidl et al. | 709/228 |
| 2007/0157091 | A1 * | 7/2007 | Wadhwa | 715/705 |
| 2007/0174150 | A1 * | 7/2007 | Wadhwa | 705/28 |
| 2008/0126075 | A1 * | 5/2008 | Thorn | 704/3 |
| 2008/0228911 | A1 * | 9/2008 | Mackey | 709/224 |
| 2008/0301558 | A1 * | 12/2008 | Najafi et al. | 715/708 |
| 2010/0010801 | A1 * | 1/2010 | Meijer et al. | 704/9 |

OTHER PUBLICATIONS

"plug-in," Microsoft Computer Dictionary, Fifth Ed., 2002, p. 515.*
Mahi2407, "Context Sensitive Help using Client Callbacks—AJAX Style," published on Sep. 25, 2006, and retrieved from http://www.codeproject.com/Articles/15663/Context-Sensitive-Help-using-Client-Callbacks-AJAX?display=Print on May 29, 2013.*
Human Translation of Chinese Office Action dated Mar. 4, 2013 for Chinese Patent Application No. 200910247122.X, filed Nov. 30, 2009, International Business Machines Corporation.*
Definitions of "Active Server Pages" and "script," "Microsoft Computer Dictionary," Fifth Ed., 2002, pp. 21 and 586.*
"Server Side Scripting Primer," May 7, 2005, from http://www.w3schools.com/web/web_scripting.asp, retrieved from the Internet Archive on May 29, 2013.*
"XMLHttpRequest," archive copy from Oct. 15, 2009 of http://en.wikipedia.org/wiki/XMLHttpRequest, retrieved from www.archive.org on Sep. 11, 2014.*
Nancy J. McClellan, Naval Postgraduate School, Monterey, CA, "Development of Dynamic, Contex-Driven Help Systems".
"Dynamic Help in Visual Studio.net", located at web site http://www.idratherbewriting.com/2007/01/09/dynamic-help-in-visual-studio-net/, Jan. 9, 2007.
Luke Wroblewski, "Dynamic Help in Web Forms", May 21, 2007.
Donovan Young, Christopher G. Smith, Mark G. Washechek, Renee Wolven, Stanley K. Haines and Walter S. Barge II, "Dynamic Help: Automated Online Documentation".
Chinese Office Action dated Mar. 4, 2013 for Chinese Patent Application No. 200910247122.X, filed Nov. 30, 2009, International Business Machines Corporation. The present U.S. application is based on the same Chinese application. See p. 8-10 for listing of documents considered to be relevant to the Chinese Examiner.

* cited by examiner

```
</DIV>
<P>
    <A href="http://www.google.com/">Google Home</A> - <A href="http://ww
</P>
</DIV>
<SCRIPT type="text/javascript">
(new Image()).src="http://www.google.com/verify/EAAAAYS2KxUboZ-EXAhfZSPZHs,
</SCRIPT>
<NOSCRIPT>
</NOSCRIPT>
<DIV class="webWinFrame" id="test" style="PADDING-RIGHT: 5px; PADDING-LEF
    <DIV class="webWin" style="BORDER-RIGHT: #b0c65a 1px solid; BORDER-TOP: #b0
        <DIV class="wTitle" style="PADDING-RIGHT: 2px; PADDING-LEFT: 2px; FONT-WEI
        Steps to recreate:
        </DIV>
        <DIV class="wContent" id="infoContent" style="FONT-SIZE: 17px; OVERFLOW: h
        <BR />Beginning of testCase              <BR />Step 1: go to the test s
        </DIV>
        <DIV class="wResizeBox" style="RIGHT: 5px; OVERFLOW: hidden; WIDTH: 5px; C
        </DIV>
    </DIV>
</DIV>
</BODY></HTML>
```

DYNAMIC HELP INFORMATION

CROSS-REFERENCE TO RELATED APPLICATIONS

This application claims priority to Chinese Patent Application No. 200910247122.X, filed Nov. 30, 2009, the disclosure of which is incorporated herein by reference.

BACKGROUND

Various aspects of the present invention relate to providing help information, and more particularly, to systems, methods and computer program products for providing dynamic on-the-spot help information to a user interacting with a software application.

New computer applications, especially web applications, are constantly emerging. These new and emerging applications are becoming complex, and require a lot of effort for a novice to completely grasp their usage. In this regard, it is becoming increasingly difficult to provide training that is effective in helping users learn these new applications.

Various approaches have been adopted for using traditional techniques to provide help information to users of such software applications. These approaches include paper reference books, electronic manuals, an on-line help desk, multimedia videos or courseware with pictures and sounds for teaching, etc. However, these traditional approaches are not always suitable for user needs. For example, the information provided in reference books and electronic manuals can be so theoretical that it is disadvantageous for users to learn various operations in practice. On-line help is relatively more direct and effective for solving problems. However, on-line help is often not suitable for beginners since many beginners may not know how to determine and describe their problems.

BRIEF SUMMARY

According to aspects of the present invention, dynamic help information is provided by receiving at least one operation of a user interacting with a software application and obtaining an operation history associated with the user, where the operation history includes at least one user operation. Dynamic help is further provided by determining appropriate help information based upon the operation history. The help information may be determined, for example, independently of code executing the software application operated by the user. Dynamic help is further provided by obtaining the help information from a help repository that stores help information associated with the software application, where the help information is provided to the user for display associated with the software application. According to still further aspects of the present invention, assistance for providing help information comprises capturing and sending at least one operation of a user to an analyzer to request help information associated with an interaction between the user and the software application. In this regard, the analyzer is independent of code executing a software application operated by the user. Assistance is further provided by receiving and displaying the help information received from the analyzer, where the received help information is determined based upon an operation history associated with the user, where the operation history includes the at least one operation of the user interacting with the software application.

DETAILED DESCRIPTION

In the following detailed description, reference is made to the accompanying drawings that form a part hereof. It is understood that the detailed description including the drawings, is illustrative, rather than restrictive, to aspects of the present invention.

Various aspects of the present invention provide methods, systems and computer program products, which facilitate the ability to provide dynamic help information to a user. In general, software providers, content developers, or other sources, prepare material for associated software/content, such as help, education material, instructions, etc., which is subscribed or otherwise stored in a repository. A user can deploy and interact with software/content in a normal manner. However, when the user needs help information, a client forwards content and/or context information to an analyzer that interacts with the repository to identify the appropriate context relevant help information. For example, in an illustrative implementation, the analyzer evaluates the received information to identify help material from the repository that is useful to the user in view of the application/content under such context associated with the activity being performed by the user. The analyzer then returns the appropriate, e.g., pruned, help information to the requesting client for display of the help information to the user. In this regard, there is no need for the software code, e.g., product, widget, web page, etc., to be changed. Rather, the implementation of a help service is stripped off of the software application and has been wrapped out such that there is no need to modify the code of the application itself. Such dynamic help can thus be provided even by a third party which is independent of an entity that maintains the software. This dramatically releases the burden of the product developer to offer dynamic help.

Figure 1:
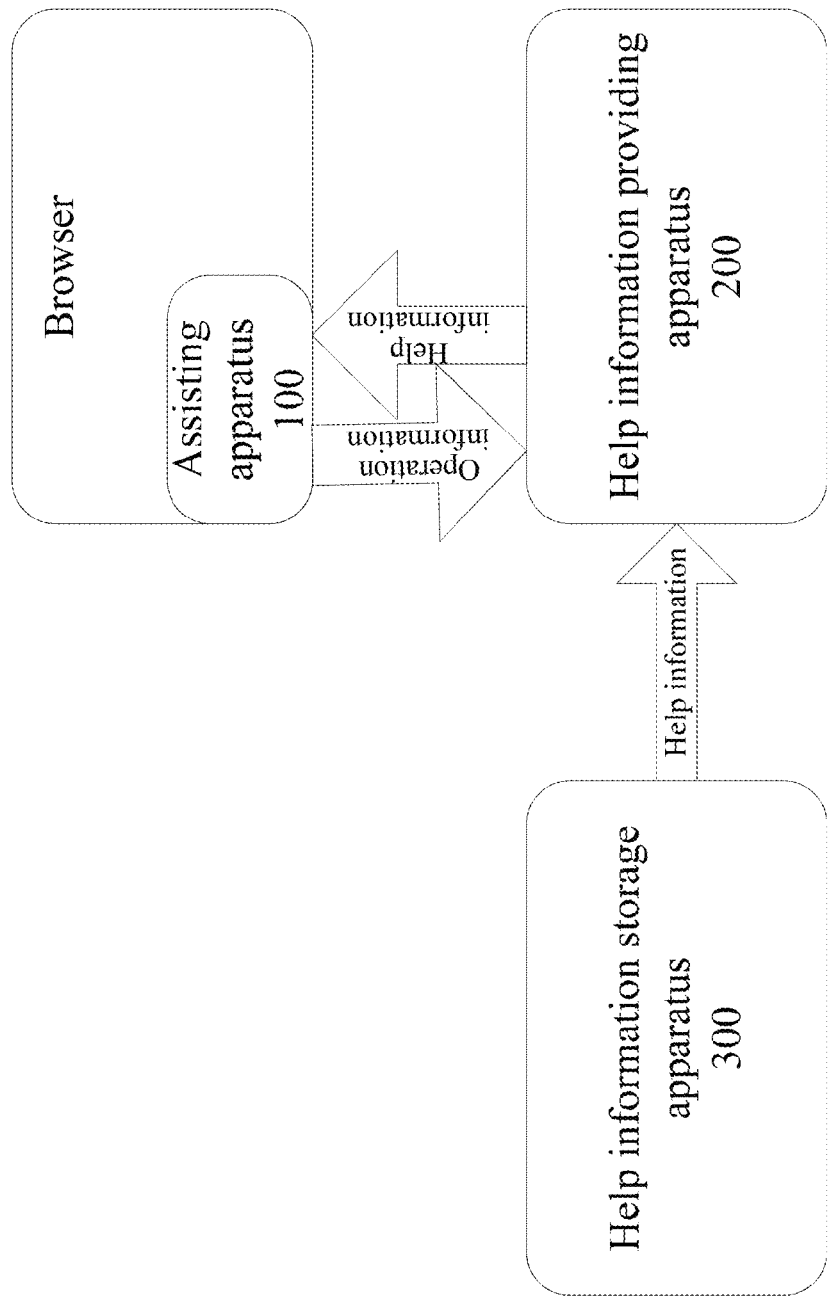
FIG. 1 illustrates a system for providing dynamic help information according to aspects of the present invention.

Referring now to the drawings, and in particular to FIG. 1, a system is illustrated, for providing dynamic help information according to aspects of the present invention. The system comprises an assisting apparatus 100, a help information providing apparatus 200 and a help information storage apparatus 300.

The assisting apparatus 100 is configured to capture and/or send context information, also referred to herein as operation situation information, to the help providing apparatus 200. The operation situation information may include information such as application content, information associating at least one operation of a user corresponding to a user interaction with a software application, history information, and user operations. The assisting apparatus 100 is further configured to receive and display help information obtained in response to the operation situation information, including user operations, sent to the help information providing apparatus 200. In an illustrative example, the assisting apparatus 100 utilizes browser related technology to provide a client-side service implemented as a browser plug-in. However, other configurations may alternatively be implemented.

The help information providing apparatus 200 is configured to receive operation situation information such as user operations corresponding to user interaction with an associated software application, the user's operation history, etc., from the assisting apparatus 100. For instance, an operation history associated with a user may include at least one operation of a user corresponding to a user interaction with an associated software application. Based upon obtained information, the help providing apparatus 200 determines help information that is appropriate in the context of the user's operation history. By way of example, the help information providing apparatus 200 may utilize a behavior map to determine what help information is required in a specific instance. The behavior map may also be utilized to determine how information will be displayed to a user under a certain context. As an illustration, in the behavior map, a "scenario, step" tuple can be used to map to a "library" tuple which describes what and how the help information is selected and displayed. As such, the help information providing apparatus 200 is able to analyze which help material is useful, for example, to a current web content that a user is interacting with, under a current content. The help information providing apparatus 200 may also be capable of determining how such help information should be displayed according to the behavior map.

The help information storage apparatus 300 is configured to store help information associated with a product, software application, widget, etc., where the help information corresponds, for example, to help in the context of various user operations. The help information storage apparatus 300 may implement, for example, a help material repository that contains help information, e.g., in the form of predefined JavaScript® libraries ("JavaScript" is a registered trademark of Oracle America, Inc. of Redwood Shores, Calif.), predefined DIV libraries, description information (e.g., DIV positions, etc.), reference information to pre-defined libraries and parameters information, and/or other necessary information to provide dynamic learning/help. In an illustrative example, a Web content developer or other software provider subscribes or otherwise registers the available help material with the help information storage apparatus 300.

With such a system, as an illustrative example, when a user tries to interact with an unfamiliar application, the assisting apparatus 100 can capture and record an operation situation, e.g., including the user's operations, and then send the operation situation to the help information providing apparatus 200. After receiving the user's operation situation, the help information providing apparatus 200 analyzes available information and determines the current user status according to an associated operation history. The help information providing apparatus 200 maps the determined user status to corresponding help information. Furthermore, the help information providing apparatus 200 retrieves the needed help information from the help information storage apparatus 300 and sends the help information back to the assisting apparatus 100. Once such help information is received, the assisting apparatus 100 appropriately displays the help information to the user. Thereby, the user can obtain the needed help information dynamically when using the unfamiliar application.

According to aspects of the present invention, dynamic help information is provided by a method and/or a computer program product and/or an apparatus that comprises a microprocessor coupled to a memory, wherein the microprocessor is programmed to obtain dynamic help for display to a user of a software application, independent of the code of the software application. In this regard, the following detailed description illustrates an exemplary implementation of the assisting apparatus 100, the help information providing apparatus 200 and the help information storage apparatus 300 in connection with web applications.

Figure 2:
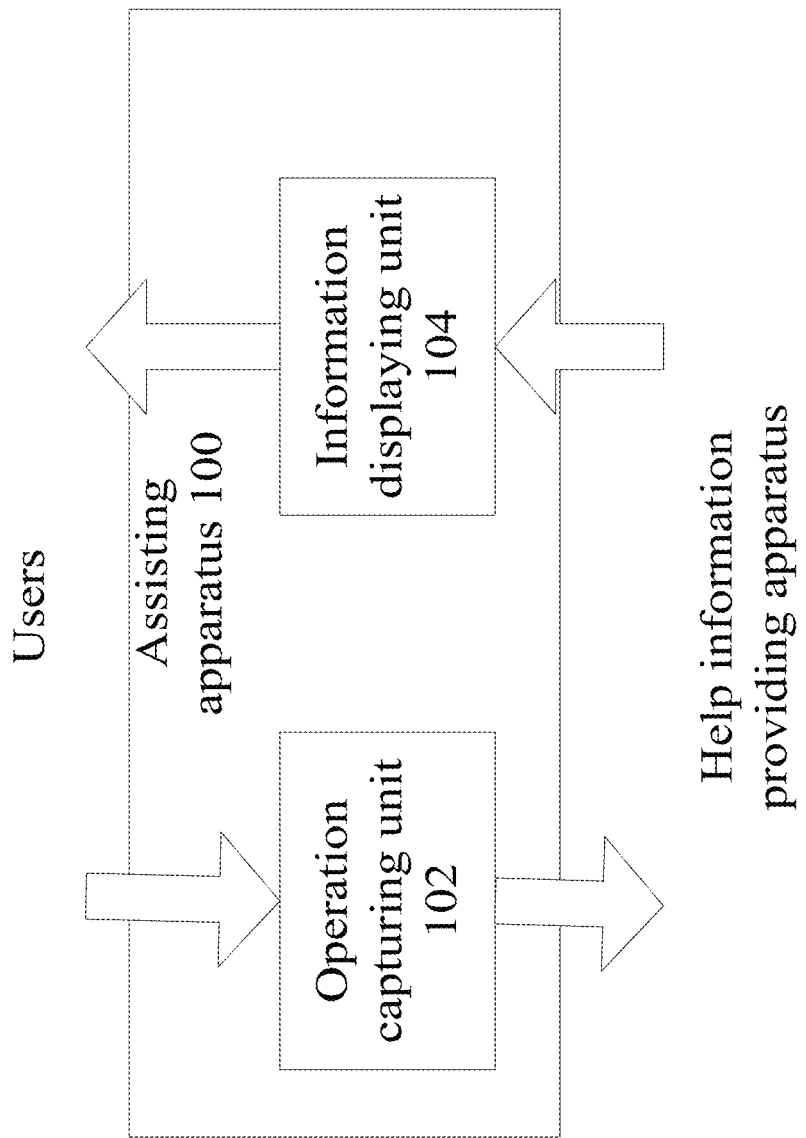
FIG. 2 is a functional block diagram of an assisting apparatus for providing help information, according to aspects of the present invention.

FIG. 2 is a functional block diagram of the assisting apparatus according to aspects of the invention. In one example, the assisting apparatus 100 is located in a browser on a client side, and is implemented as a browser plug-in. The assisting apparatus 100 functionally comprises an operation capturing unit 102 and an information displaying unit 104. The operation capturing unit 102 is configured to capture operations performed by the user on a web application, and send one or more captured operations to a help information providing apparatus 200 associated with the web application. The information displaying unit 104 is configured to receive help information from the help information providing apparatus 200 and display the received help in a proper way.

Specifically, the operation capturing unit 102 can capture user operations on a web application through various approaches. In one example, as a part of the browser plug-in, the operation capturing unit 102 can obtain user operations by capturing mouse clicking, mouse dragging, keyboard inputting, etc. The operation capturing unit 102 may also capture browser history information or other information captured during operation of the client-side computer. In another illustrative example, the operation capturing unit 102 may further record the obtained series of user operations, so as to form an operation history for the user. Based on the above, the operation capturing unit 102 analyzes or otherwise identifies the current web application that the user is interacting with, and determines the corresponding help information providing apparatus 200. The assisting apparatus 100 may send a single operation step or multiple operation steps obtained by the capturing unit 102 to the corresponding help information providing apparatus 200. Still further, the operation capturing unit 102 can directly send the recorded operation history to the appropriate help information providing apparatus 200.

The information displaying unit 104 is configured to receive and display the dynamic help information received from the help information providing apparatus 200. Specifically, once the information displaying unit 104 is in receipt of the help information corresponding to user operations, the information displaying unit 104 displays the received help information at a suitable position on the webpage of the associated web application in a proper manner. Usually, the received help information contains description text and displaying information. The displaying information includes various parameters and codes related to displaying the received help information. Exemplary displaying information comprises the form of the information to be displayed, the position with the application display where the help information is to be displayed, the transparency of a window that displays help information, the font, style and size of the text, etc., used to display help information, etc.

In one example, DIV layers and corresponding JavaScript® code characterize information that describes how help is provided/displayed. Web pages are mostly managed by layers and a DOM tree, and DIV is just the language that defines displaying information in layers. Thus, displaying help information in such form is especially suited when help information is displayed on existing web pages. In this case, the information displaying unit 104 embeds DIV tags and the corresponding JavaScript® into a DOM tree of the current page in the associated browser. That is, the information displaying unit 104 inserts the necessary DIV and JavaScript® commands respectively into the source code of the current web page of the web application temporarily. Then, when reading the source code and thereby performing display, the browser can display the help information text properly according to the displaying information.

Figure 3:
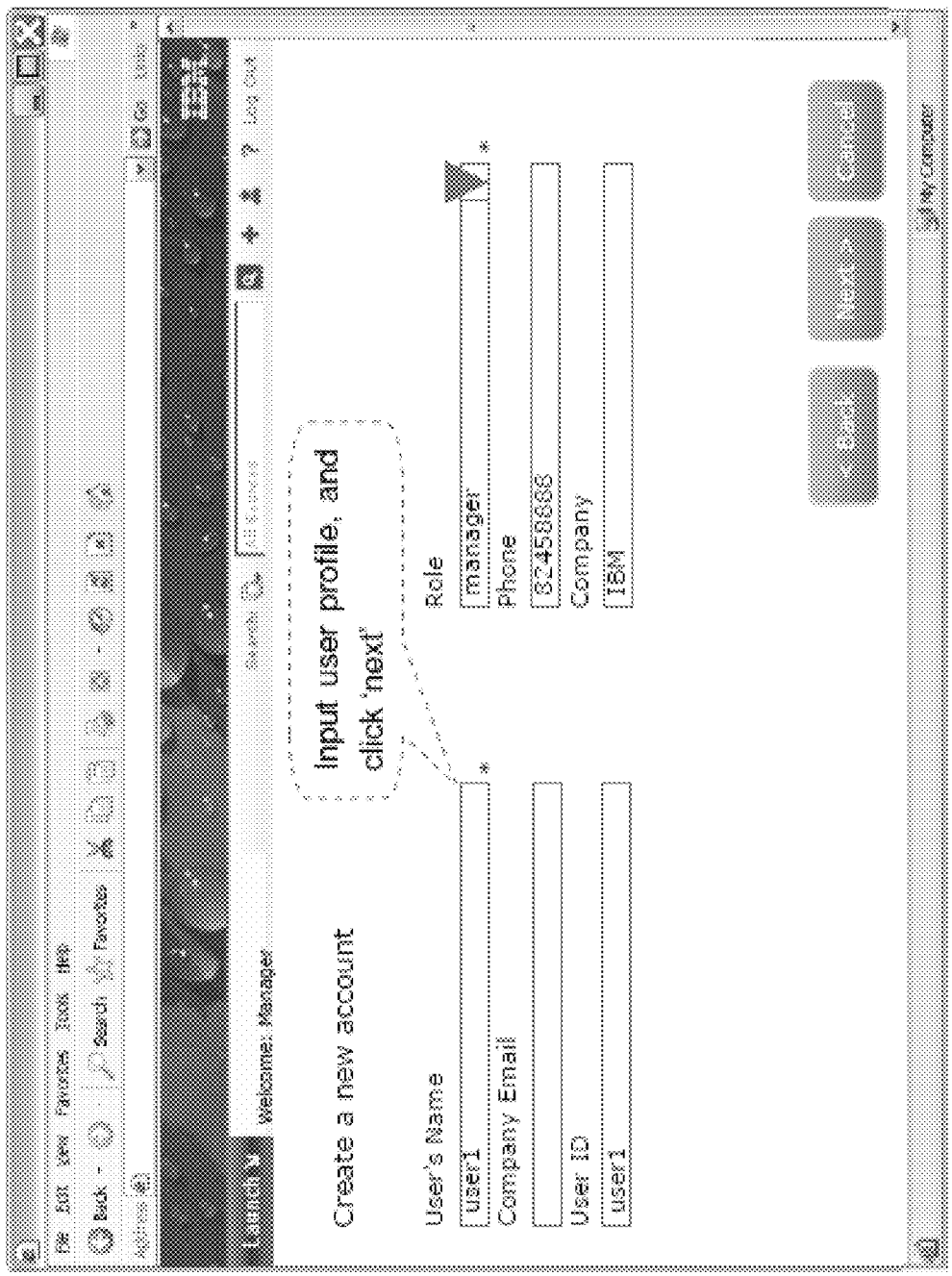
FIG. 3 illustrates a scenario of displaying help information according to aspects of the present invention.

FIG. 3 illustrates a scenario of displaying help information according to aspects of the present invention. In the example in FIG. 3, a user is attempting to create a new account in a web application. The user is currently at the User Name field, so the system displays, in this example, dynamic help information, which prompts the user to "Input user profile, and click 'next'". Such help information text is displayed, for example, in a floating, semi-transparent textbox beside a first widget used to accept user input, so as to give hints to the user on how to perform the action.

Figure 4:
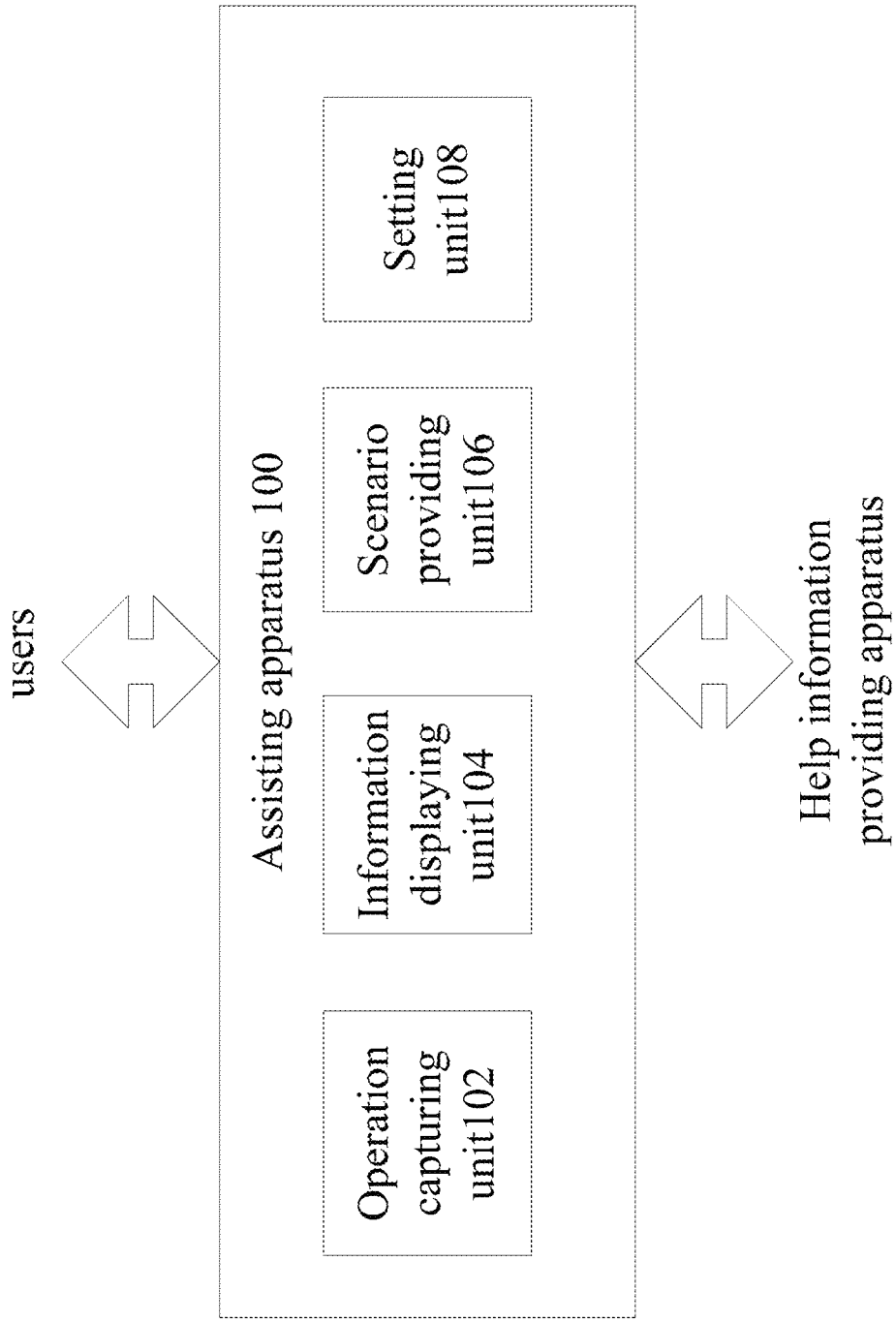
FIG. 4 is a functional block diagram of an assisting apparatus according to further aspects of the present invention.

Optionally, the assisting apparatus 100 may further comprise other functional units. FIG. 4 is a functional block diagram of the assisting apparatus according to further aspects of the present invention. In FIG. 4, besides corresponding units with the same function as those of the operation capturing unit 102 and information displaying unit 104 shown in FIG. 3, the assisting apparatus 100 additionally comprises a scenario providing unit 106 and a setting unit 108.

According to aspects of the present invention, the scenario providing unit 106 is configured to classify web application functions into a plurality of scenarios. Example scenarios may comprise, for example, creating a new account, making a new order, modifying the existing data, etc. The scenario providing unit 106 also provides various scenarios to a user as options. When a user makes a selection from the provided scenarios, the scenario providing unit 106 sends the selected scenario to the help information providing apparatus 200 so that the information providing apparatus 200 can perform a relatively quick analysis on the current user status to identify appropriate help information.

The setting unit 108, can be implemented as another user interface, which receives user settings with regard to the displaying of information, such as the textbox size, the textbox transparency, the font, size, color of the text, etc. In one example, once user settings on the display of information have been obtained, the setting unit 108 modifies the default settings of the received displaying information into the corresponding user settings, and then sends the modified displaying information to the information displaying unit 104 to perform display of received help information. In another example, the setting unit 108 can also send user settings to the server side to store the user settings at the server side, so as to directly receive the displaying information in accordance with user settings for use in the future.

The assisting apparatus 100 can comprise other functional units related to user operation capturing, and help information displaying, depending on the settings on the client side of the browser, and based on user needs. For example, the assisting apparatus 100 may also comprise a startup option, through which a user can decide whether or not to start the dynamic help information service and the assisting apparatus. Such functional extension to the above embodiments is also within the scope and spirit of the present invention.

To obtain the dynamic help information, the assisting apparatus 100 communicates with the help information providing apparatus 200, sending user operations to, and receiving dynamic help information from, the help information providing apparatus 200.

Figure 5:
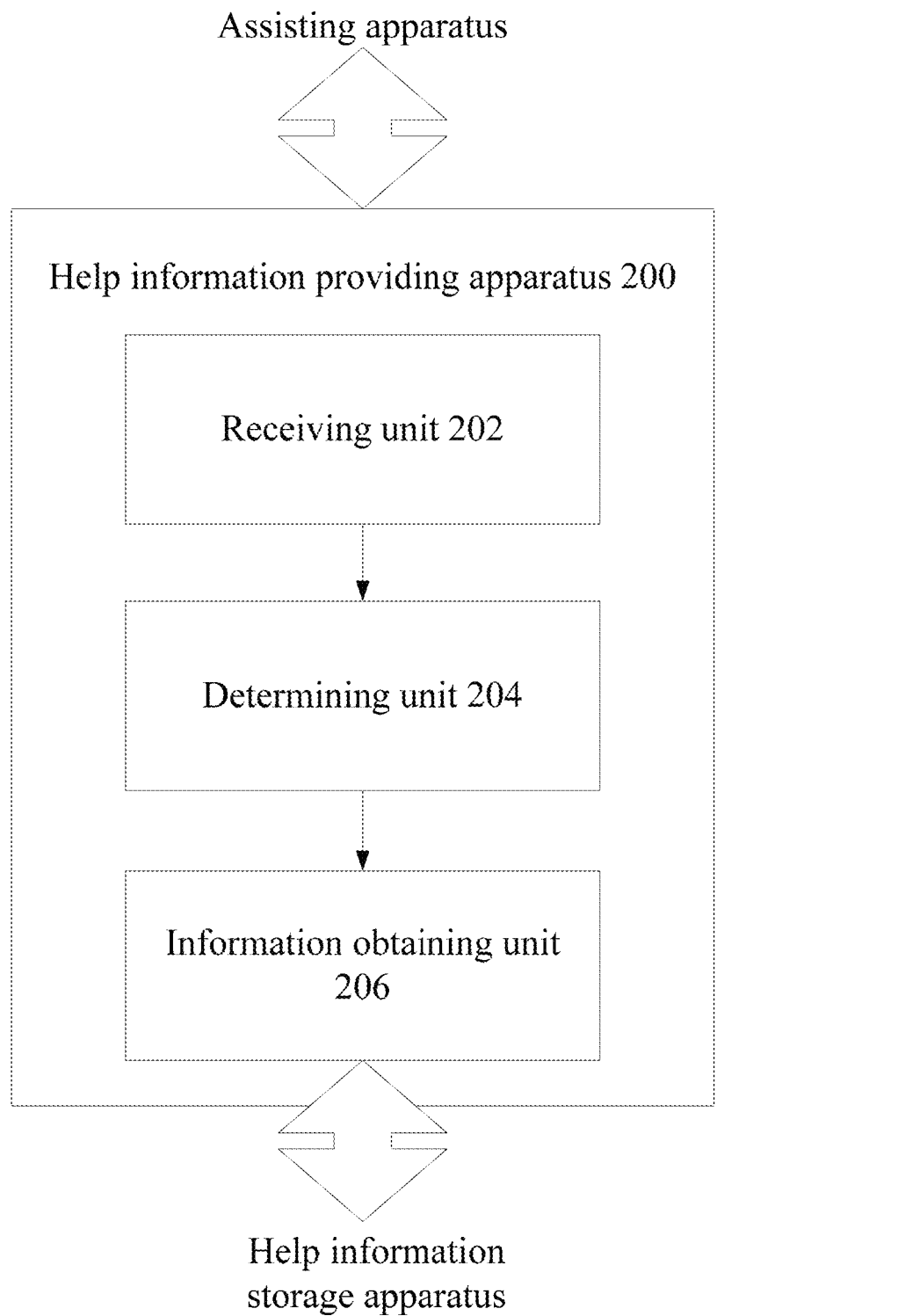
FIG. 5 is a functional block diagram of a help information providing apparatus according to further aspects of the present invention.

FIG. 5 is a functional block diagram of a help information providing apparatus 200, according to aspects of the present invention. The illustrated help information providing apparatus 200 comprises a receiving unit 202 that is configured to receive user operations on web applications and to obtain an operation history associated with the user, where the operation history includes the received user operation(s). The help information providing apparatus 200 also comprises a determining unit 204 that is configured to determine the corresponding help information according to the user's operation history. The help information providing apparatus 200 still further comprises an information obtaining unit 206 that is configured to obtain the corresponding help information.

Specifically, the receiving unit 202 receives information about user operations on a web application from the assisting apparatus 100. If the received operation information comprises multiple steps of operations or an operation history, the receiving unit 202 can obtain the user's operation history directly. If the received operation information is a single step, the receiving unit 202 can make reference, for example, to previously received user operations, in order to obtain the user's operation history. After obtaining the operation history, the receiving unit 202 sends the operation history to the determining unit 204 to perform an analysis for purposes of identifying appropriate help information.

The determining unit 204 obtains the user's operation history from the receiving unit 202 and performs an analysis on the received operation history. Specifically, the determining unit 204 determines the current status of the user according to the operation history and maps the determined status to corresponding help information. In one example, the determining unit 204 maintains a mapping table, storing the correspondence of each user status and the help information, where the help information is stored using indexes or pointers. The determining unit 204 can thus quickly determine the index or the pointer of the needed help information by making reference to the mapping table. The appropriate help information can then be retrieved and sent to the corresponding information obtaining unit 206.

Once receiving the index or the pointer of the needed help information, the information obtaining unit 206 searches the corresponding help information storage apparatus 300 according to the index or the pointer and retrieves the help information directed by the index or the pointer. As above-described, the retrieved help information may contain description text and displaying information. After retrieving such help information, the information obtaining unit 206 sends the retrieved help information to the assisting apparatus 100 to display the retrieved help information.

To obtain the needed help information, the help information providing apparatus 200 communicates with, and thus reads data from the help information storage apparatus 300. Therefore, the help information storage apparatus 300 stores the help information data corresponding to the operated web application.

Figure 6:
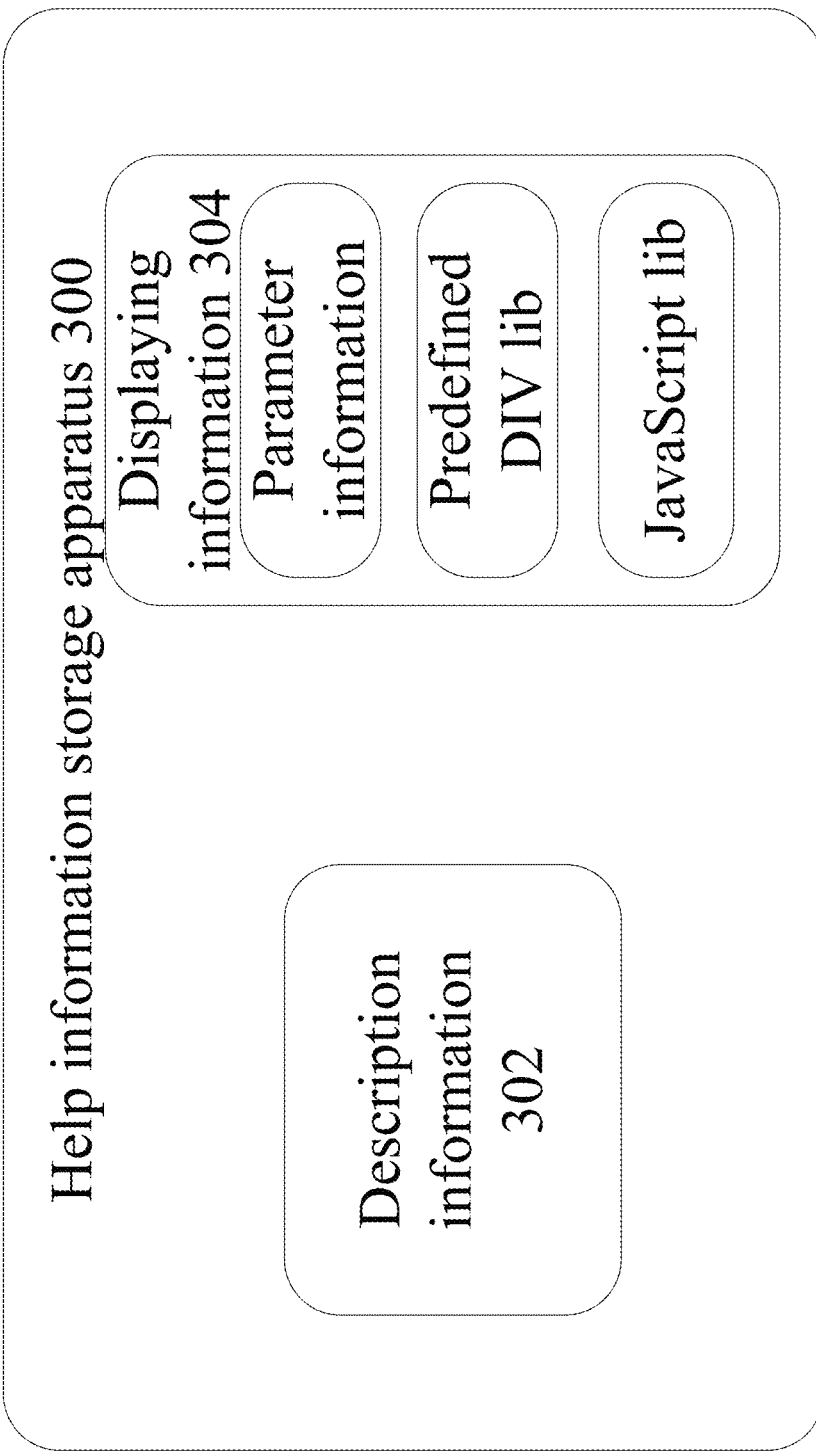
FIG. 6 is a block diagram of a help information storage apparatus according to aspects of the present invention.

FIG. 6 is a block diagram of the help information storage apparatus 300. The help information storage apparatus 300 stores help description information 302 and displaying information 304. The help description information 302 contains description texts of help information, which describe the explanation and hints for each possible step or condition experienced by the user when operating a web application. The displaying information 304 contains parameters and functions associated with above description of texts, such as the form, the position, the transparency of a help providing textbox, the font, style, size of the help text, etc. In one example, the displaying information 304 comprises parameter information, a pre-defined DIV library and a pre-defined JavaScript® library. By calling the pre-defined DIV library and pre-defined JavaScript® library and embedding the corresponding parameter information and description texts, the code that describes the help information can be obtained directly. Therefore, the help information providing apparatus 200 can get such code directly from the help information storage apparatus 300 and send it to the assisting apparatus 100. Furthermore, the assisting apparatus 100 may insert such code directly into the source code of the current web page, so as to display the help information.

Figures 7A, 7B:
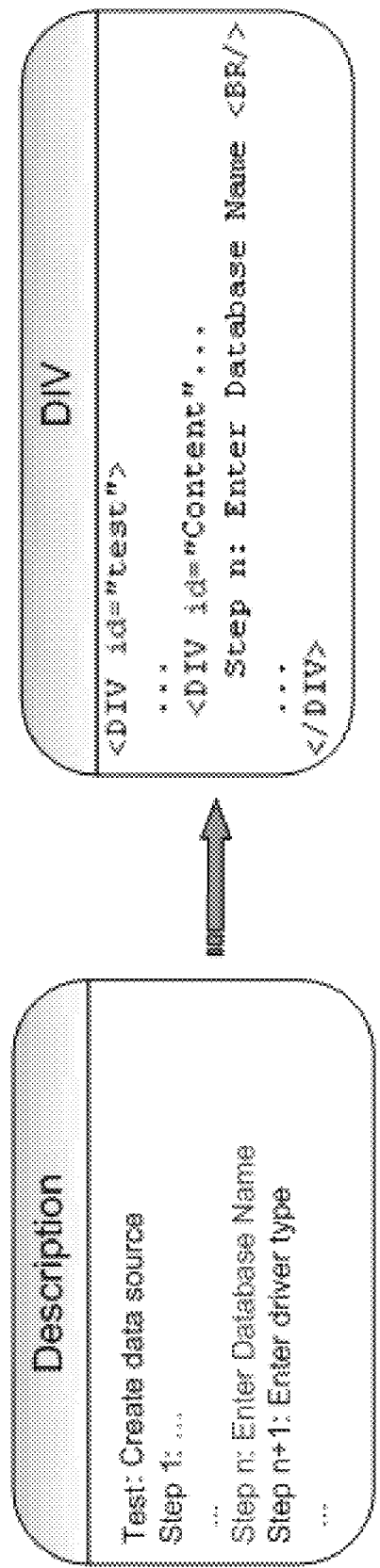
FIG. 7 illustrates exemplary code related to components of help information, according to aspects of the present invention.
Figure 7C:
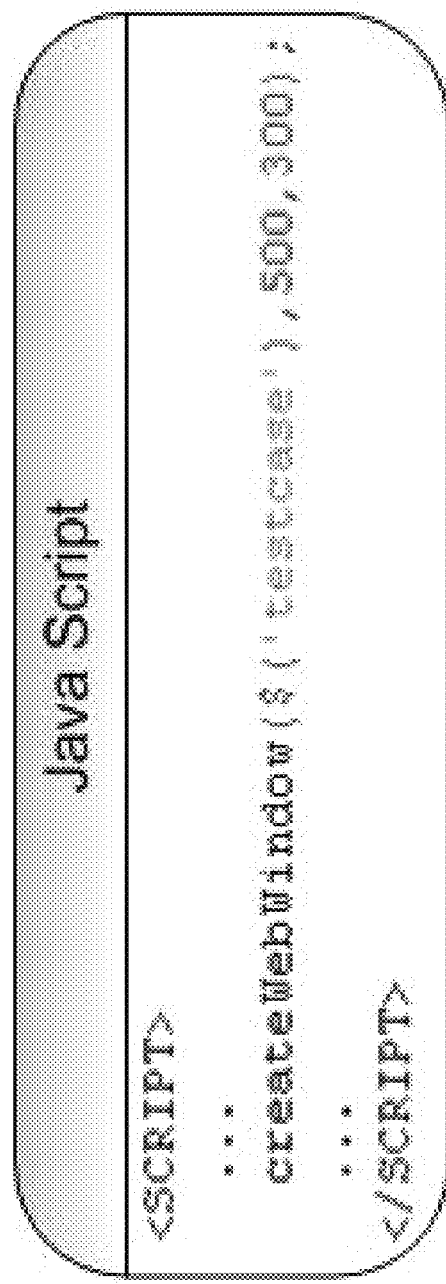
Figure 7E:
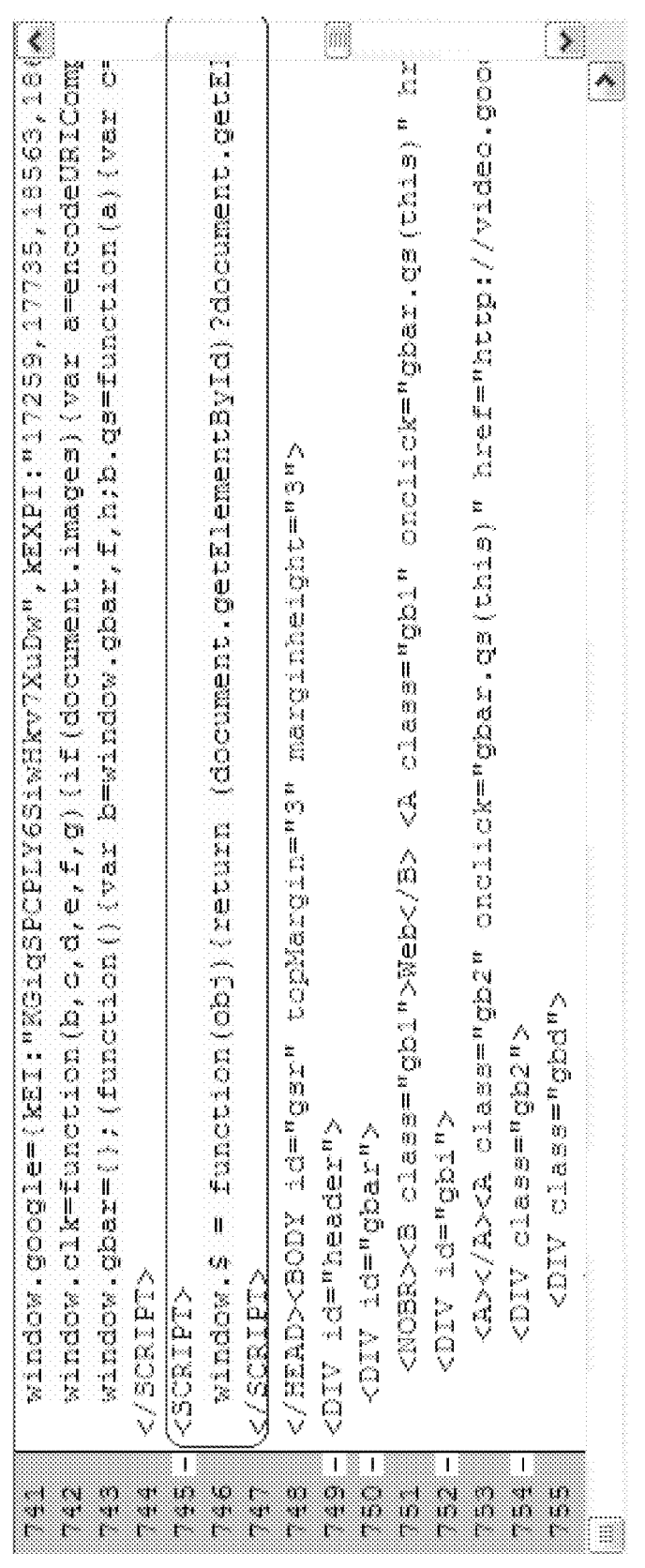

FIGS. 7A-7C illustrate exemplary code segments related to a section of help information. FIG. 7A illustrates an exemplary description of texts of the help information, which define the help text from step 1 to step n+1. FIG. 7B illustrates the DIV code corresponding to the description text in FIG. 7A. FIG. 7C illustrates the JavaScript® code related to the DIV code of FIG. 7B. FIG. 7D and FIG. 7E respectively illustrate the DIV code and the JavaScript® code inserted in the source code, which are marked with quadrangles.

With the above-described manner, the assisting apparatus 100, the help information providing apparatus 200 and the help information storage apparatus 300 cooperate with one another to provide dynamic help information for users. As mentioned above, the dynamic help information is provided based on the user's operation history, which illustrates an exemplary feature that makes the systems described herein, distinct from those in the conventional techniques that provide static help information. That is, the dynamic help information provided according to aspects of the present invention described herein, is based at least in part, upon certain context, and therefore different operation history may result in different prompts and help information even at the same step.

The following provide illustrative descriptions of different scenarios to which aspects of this invention may apply. Suppose a user is using a web application with an online ordering function. In order to accomplish an order set in the web application, the user needs to finish the following steps on the pages provided by the web application: creating a new account, placing an order, signing the confidentiality agreement, confirming the order when the successful order is displayed by the web application, and choosing whether to mail the order form.

In an illustrative scenario, the user first enters into the page for creating an account. The help system according to aspects of this invention, prompts the user to input personal information and click next, wherein the required fields are marked with indicia such as a red star. Suppose the user has entered input into all fields including name, occupation, address, email, telephone, etc. Then, the user clicks "next" according to the prompt and enters into the page for placing an order. Here, the help system prompts the user to choose the desired product. After the user selects a desired product, the user enters into the page for signing the confidentiality agreement by following the prompt. Here the system prompts the user to make a decision with regard to the confidentiality of the user's information. Suppose the user chooses to keep all data confidential. Finally, the web application presents the user's order information in an order form on a new page and asks the user to confirm that the order is correct. At this time, the user finds that the option for mailing the order form is presently disabled. Here, the system would prompt the user that the order form can't be mailed because the user chooses all data kept secret.

In a second illustrative scenario, the user enters into a web page for creating an account as above, and inputs personal information according to the dynamic help information. Suppose the user only inputs data into select ones of the required fields, such as name and occupation, without inputting address and email. Then the user chooses the products to place an order according to the prompt. After that, the user follows the prompt and enters into the page for signing the confidentiality agreement. Suppose the user agrees to allow all entered information to be open to the public. The user will finally find on the order form displaying page that the option for mailing the order form is still prohibited. Here, the system would prompt that the order form can't be mailed because the user failed to input email and address information.

In a third exemplary scenario, under the system prompts, the user inputs all fields for creating an account and allows the data to be public. Then, on an order form displaying page, the option for mailing the order form is enabled. Here, the help system would prompt the user that the order form can be mailed to the designated address if such an option is chosen.

It can therefore be seen that the help system according to aspects of the invention described in greater detail herein, can provide different prompts based on the user's operation history. Aspects of the present invention thus conceptually function as a web application expert, who is skilled in using the web application, and at the same time, is conscious of the user's operation status. Therefore the help system is able to provide pertinent help information and prompts directed to the current operation step with reference to the previous operation history.

On the other hand, from the point of view of the system architecture, in certain illustrative implementations of aspects of the present invention, the assisting apparatus 100 is located on the client side of the browser, and the help information providing apparatus 200 and the help information storage apparatus 300 are on the server side of the service of providing dynamic help. However, each of the assisting apparatus 100, help information providing apparatus 200 and help information storage apparatus 300, are separate from the associated web application. As a result, the dynamic help service provided by the systems described herein, are conceptually stripped off and separated from a service of the web application itself. Therefore, the help information service can be developed and provided by a third party that is independent on the web application, which makes this service more flexible and professional. Meanwhile, this would dramatically release the burden of the web application service side to modify the source code to provide help information. In one example, the help information providing apparatus 200 and the help information storage apparatus 300 can even be based on an open platform, to which anyone who is familiar with a certain web application can add and register their known help information. In this way, the help information provided by the system of this invention may be more complete and flexible.

It is understood that the help information providing apparatus 200 and the help information storage apparatus 300 described in greater detail herein, can be implemented in various ways. The help information providing apparatus 200 and the help information storage apparatus 300 can be integrated together, or implemented as two isolated apparatuses. In the case that the help information providing apparatus 200 and the help information storage apparatus 300 are implemented as two isolated apparatuses, each functional unit can be located selectively in different apparatus according to the storage capacity and the calculating ability of respective apparatuses. For instance, if the storage capacity of the help information storage apparatus 300 is not enough, a part of displaying information can be stored in the help information providing apparatus 200. Moreover, the communication among the assisting apparatus 100, the help information providing apparatus 200 and the help information storage apparatus 300 can be realized by any suitable techniques.

In the above description, the assisting apparatus 100, the help information providing apparatus 200 and the help information storage apparatus 300 are explained in detail in connection with a web application. However, the apparatuses and system of this invention can also be applied in other applications. For example, in the case of a local desktop application, the system could capture user operations on the desktop application and provide help information dynamically according to the user's operation history. Here, the assisting apparatus 100, the help information providing apparatus 200 and the help information storage apparatus 300 can be located partially on a local side, partially on a server side, or even totally on a local side as desired. Moreover, the assisting apparatus 100, the help information providing apparatus 200 and the help information storage apparatus 300 can be implemented selectively as multiple apparatuses or as an integrated single apparatus according to different applications and local processing ability. Thus, those skilled in the art can adopt different embodiments in different situations based on the above description.

Figure 8:
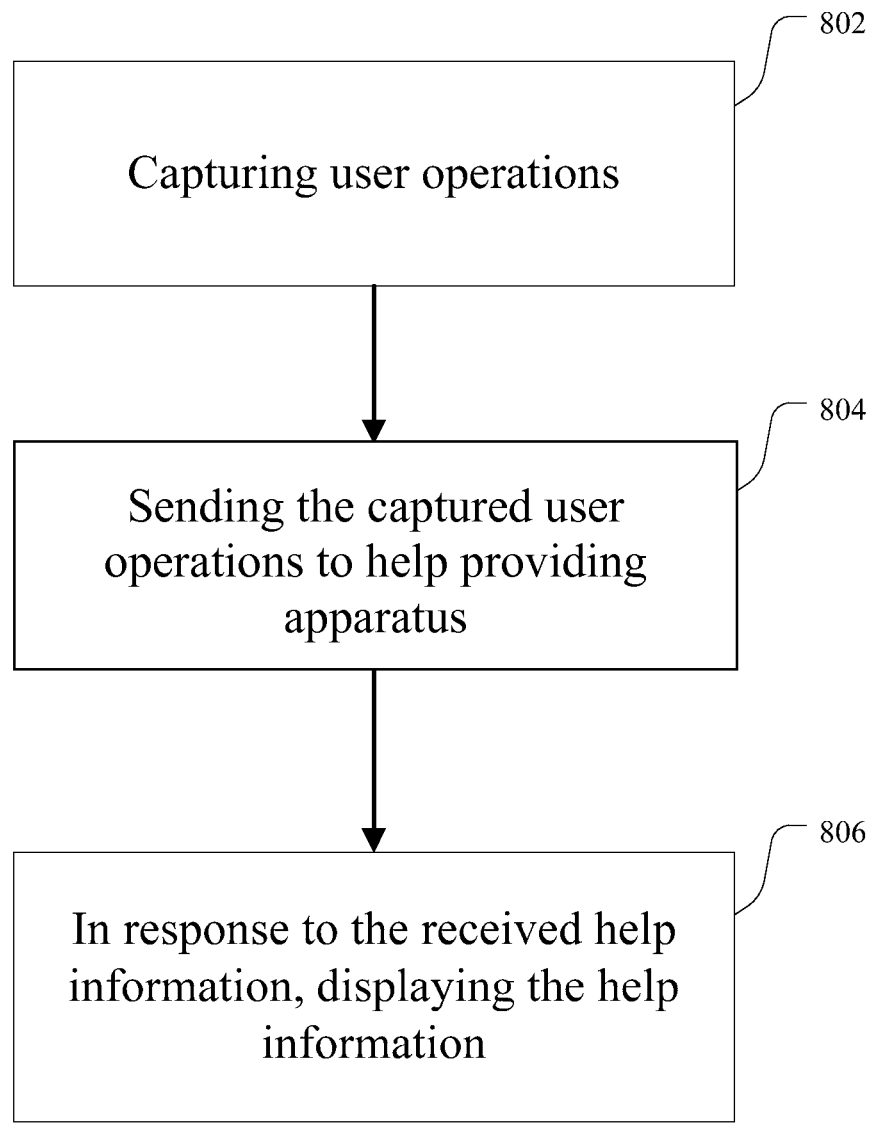
FIG. 8 is a flowchart of a method for assisting in providing help information according to aspects of the present invention.

FIG. 8 is a flowchart of the method for assisting in providing help information according to an aspect of the present invention. The method is executed by the assisting apparatus 100 in FIG. 1. The method for assisting in providing help information comprises capturing user operations at 802, sending the captured user operations to the help information providing apparatus 200 at 804 and in response to the received help information, displaying the help information appropriately at 806.

Specifically, at 802, capturing user operations can be realized, as described more fully herein, by catching mouse clicking, mouse dragging, keyboard inputting, etc., performed by the user. At 804, the process may send a single captured operation step or a plurality of operation steps, or alternatively record the user's operation first to form the operation history, and then directly send the operation history. At 806, once the help information corresponding to the user operations is received, such help information is displayed at an appropriate position on the web application interface in a proper way. Usually, the received help information contains description text and displaying information. In one example, the displaying information is provided using DIV layer(s) and corresponding JavaScript® code. In this case, at 806, DIV layers and corresponding JavaScript® code are temporarily inserted into the source code of the current page of the web application, respectively. Then, the browser can display the description text appropriately according to the displaying information.

Figure 9:
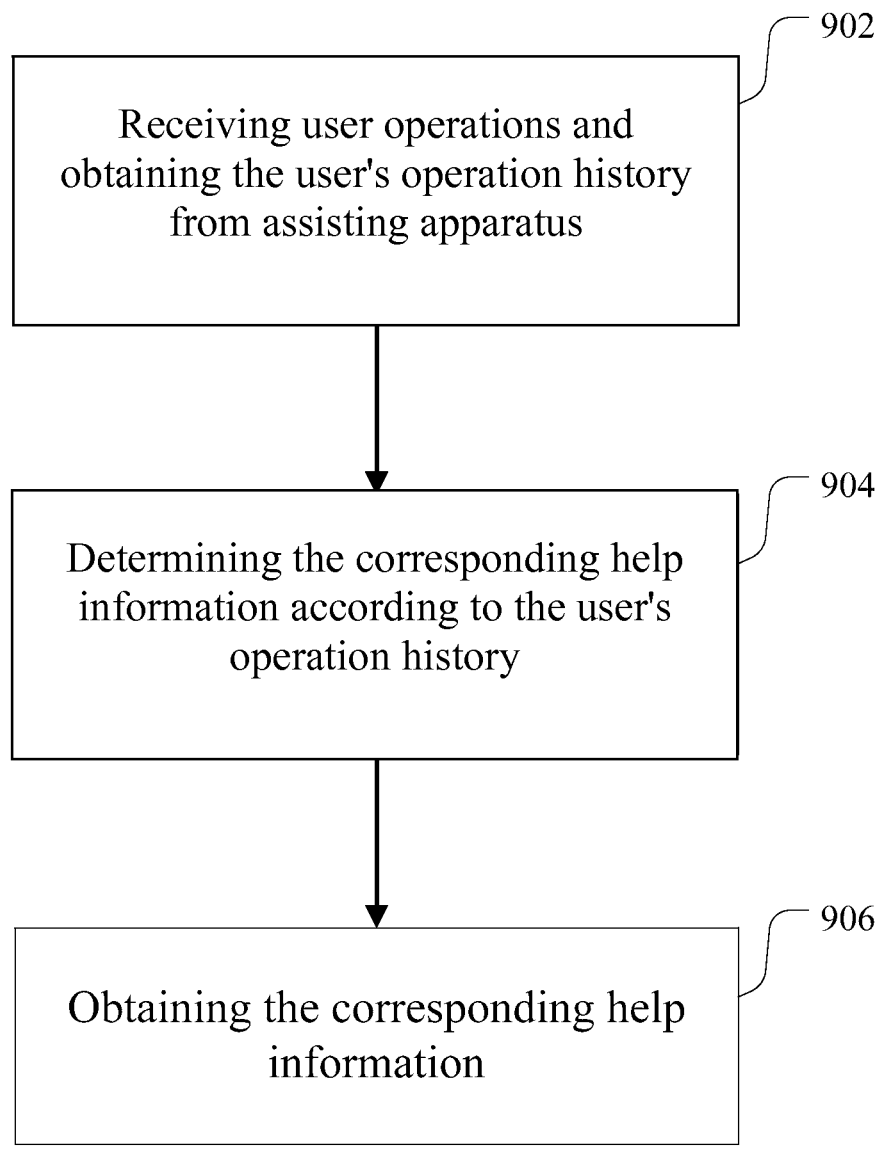
FIG. 9 is a flowchart of a method for providing help information according to aspects of the present invention.

FIG. 9 is a flowchart illustrating a method for providing help information according to aspects of the invention. The method is executed by the help information providing apparatus 200 in FIG. 1. The method for providing help information comprises receiving user operations from the assisting apparatus 100 at 902 and obtaining the user's operation history at 904, in which the corresponding help information is determined according to the user's operation history. Further, the method comprises obtaining the corresponding help information at 906.

Specifically, at 902, if the received operation information is a plurality of operation steps or the operation history, then the user's operation history can be obtained directly. If the received operation information is a single step, then at 902, the user's operation history is obtained with reference to the previous received operation steps. At 904, the obtained operation history is analyzed. More specifically, the current user status is determined according to the user's operation history and then the status is mapped to the corresponding help information. In an illustrative example, a user status is mapped by referring to a mapping table which records the correspondence between each user status and the help information. In this manner, an index or pointer of the currently needed help information can be quickly determined. At 906, the help information identified by the index or the pointer is retrieved from the apparatus storing the help information according to the index or the pointer. As above-mentioned, the obtained help information may contain description text and displaying information. After such help information is retrieved, the help information is then sent to a user computer for display at 906.

Figure 10:
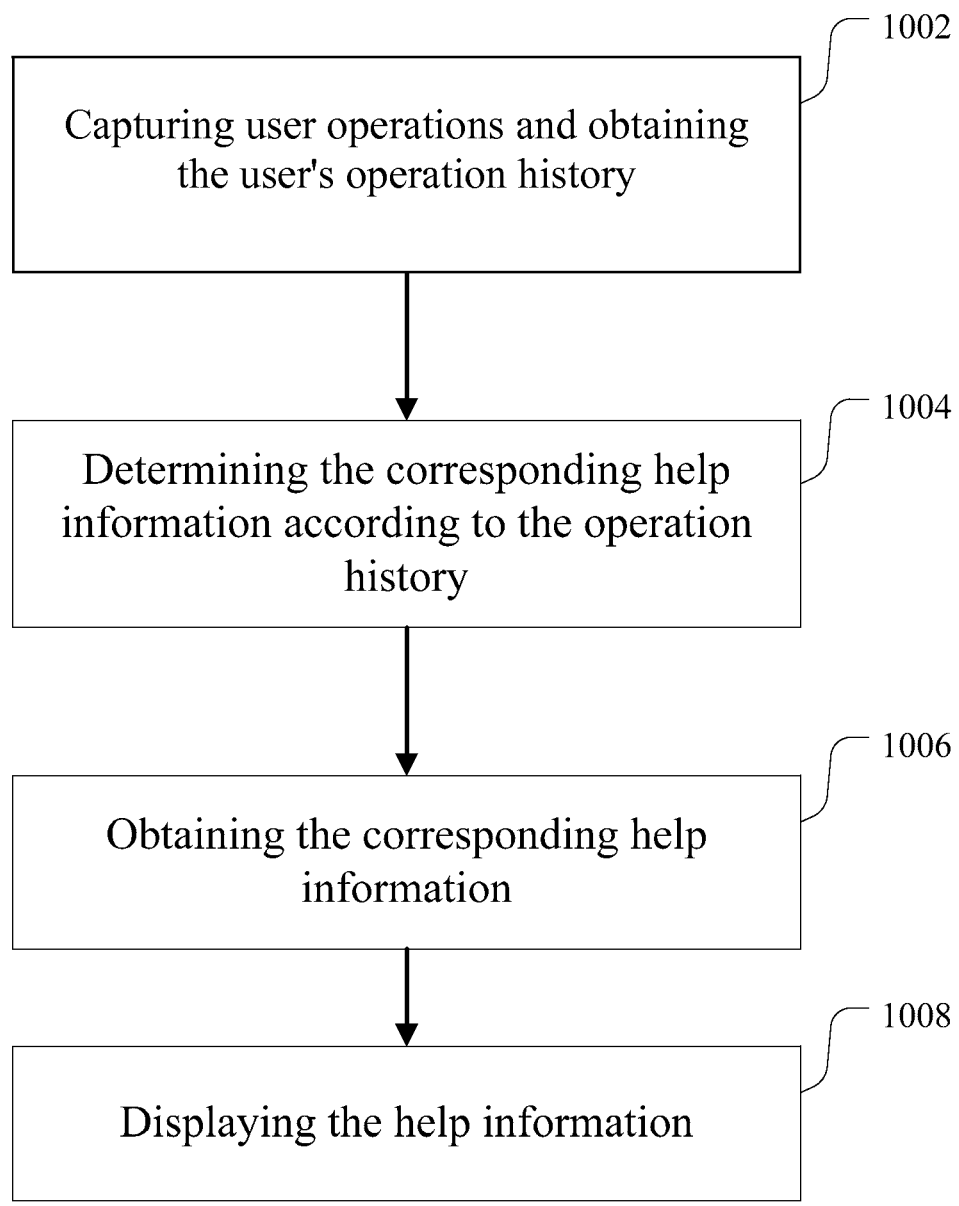
FIG. 10 is a flowchart of a method for providing and displaying help information according to aspects of the present invention.

FIG. 10 is a flowchart of a method for providing and displaying help information according to aspects of the present invention. The method is executed, for example, by the system in FIG. 1. As shown, the method for providing and displaying help information comprises capturing user operations and obtaining the user's operation history at 1002, determining the corresponding help information according to the operation history at 1004, obtaining the corresponding help information at 1006, and displaying the help information at 1008. Since the conception and the execution manner of the method in FIG. 10 are accordant with those of the above-mentioned system, such aspects are not discussed in further detail herein.

Aspects of the present invention avoid issues associated with passive learning methods, where users read or watch guidance passively without any interaction, feedback or real participation. For instance, in a typical Web 2.0 environment, there can be several windows and widgets on a webpage that are utilized to enrich a corresponding application. Such widgets also make web applications more changeable. Each different user operation can lead to a different application process and a different outlook, which makes static, pre-defined help information difficult to cover all possible cases in a web application. However, as described in greater detail herein, various aspects of the present invention promote the improvement of learning efficiency by providing dynamic, "on-spot" learning and/or help such that there is no need for a software product, e.g., a Web 2.0 application, widget, or other software, to require changes to the program code to accommodate the new help information provided to the user.

In this regard, various aspects of the present invention provide dynamic and pertinent guidance, e.g., providing dynamic learning and/or help instructions to users on what to do next when executing an application requiring user interaction. As such, products can provide the needed help information step by step, dynamically when a user is interacting with a corresponding application.

The dynamic and pertinent guidance may be provided as a service that is logically distinct from an associated software application to which the learning/help applies. In this regard, such learning/help can be provided even by a third party, which is independent of an entity that provides the associated software application. Such an arrangement releases the burden of the product developer of the associated software application to offer learning/help. Thus, there is no need for a developer of an existing product to modify the corresponding code on the server side to support the above-mentioned on-spot hints and explanations. Modifying the code on product server side is a huge effort and is not easy to be maintained.

In an illustrative example, a user/learner connects to a server to interact with a product in an normal manner. However, using a client such as a plug-in for a corresponding Web browser, a "learning mode" can be enabled to start the interactive learning process. For each scenario chosen by the user, process guidance may be provided, which tells the user what to do next, and action guidance may be provided, which tells the user how to perform the next step, etc. In this regard, the user can follow this on-spot help information step by step to proceed smoothly while interacting with the corresponding application. Alternatively, there may not be a need to turn on a "learning mode" or take other action. For instance, dynamic help may be always available.

In another illustrative, exemplary implementation, the plug-in acts as a control center and implements a driver, e.g., to monitor the steps changing in a certain scenario and import related JavaScript® scripts and DIV APIs from the help information storage apparatus 300 via the help information providing apparatus 200. The help information and parameter information, combined with related application programming interfaces is injected as code into the corresponding browser document object model (DOM) tree. The user operates according to the prompt information, e.g., to enter the correct information according to a real time hint. By clicking "next" or some other command in the prompt area, prompt help information will be displayed, such as where to fill the information next or which button to click next. The button could twinkle, e.g., in yellow, or provide any additional visual features or aesthetic while waiting for user to respond. The corresponding hint information is typically automatically displayed nearby the prompted field.

It is up to the user to choose whether to go on to the next step. However, when a next step starts to run, the JavaScript® scripts injected will create new prompt information based on DIV technology. In this regard, the real time execution description is synchronized with the current execution step, which means the description of the execution process is embedded into the execution environment, e.g., a browser for a web application in this illustrative example. The description information is displayed synchronously with a learning case in the execution environment, e.g., a web browser for a web application, such as by appropriately modifying, e.g., by inserting information into DOM objects in the example of a Web browser.

During execution, the complete combined information is dynamically and momentarily displayed as the user steps through an application. The help/information display appears as if it is part of the execution GUI, e.g., web page in this example. The attributes of the display could be customized, such as the position, font, etc of the letters, the transparency of the display, etc. As an illustrative example, the execution step information may be contained in a fly-over half transparent DIV layer when executing. Additionally, a user could use a mouse to move or resize the displayed help/learning information, etc.

Figure 11:
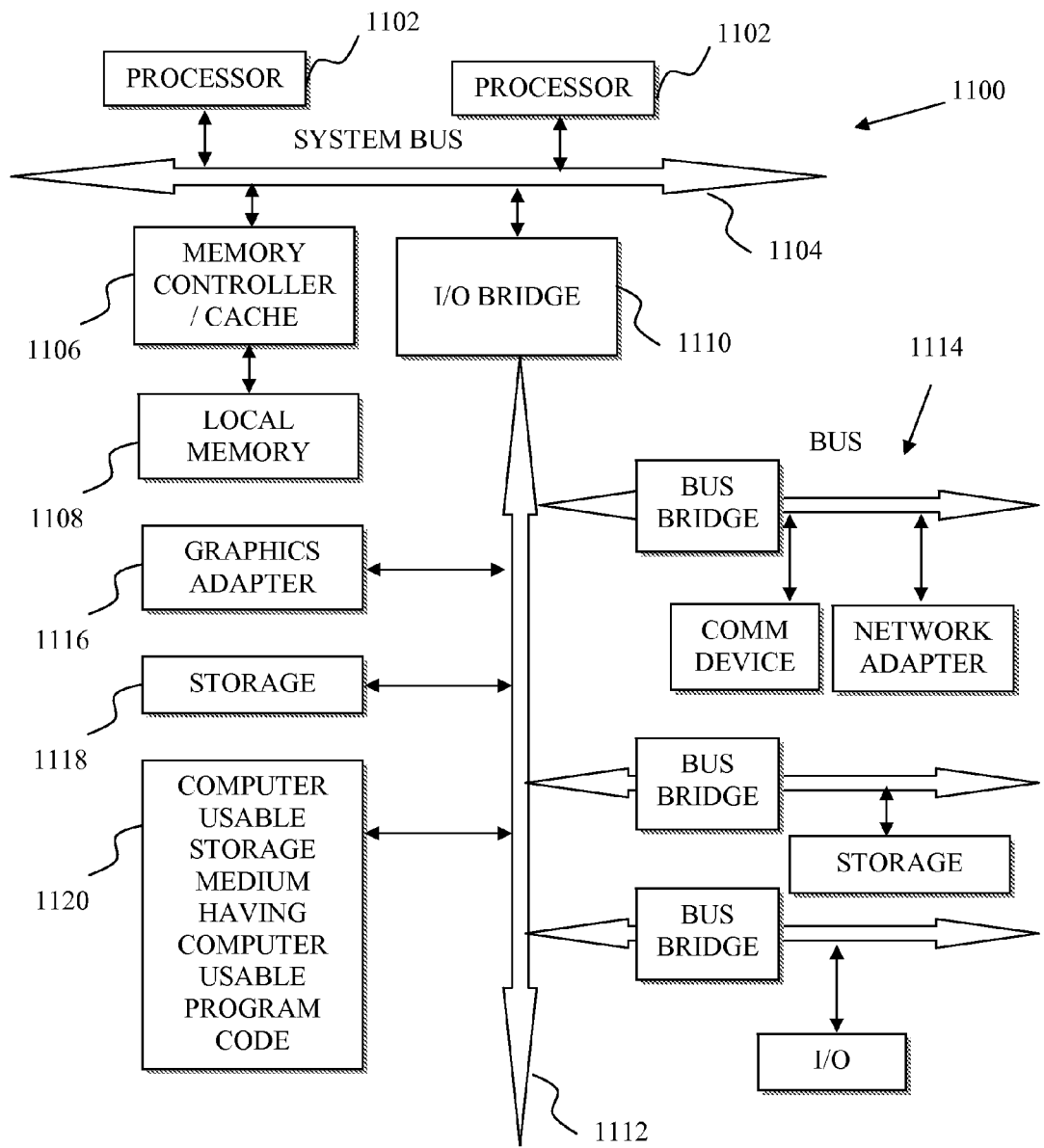
FIG. 11 is a block diagram of a computer system having a computer readable storage medium for implementing one or more of the methods, computer program products and/or components described in greater detail herein, according to various aspects of the present invention.

Referring to FIG. 11, a block diagram of a data processing system is depicted in accordance with various aspects of the present invention. Data processing system 1100, such as a server, may comprise a symmetric multiprocessor (SMP) system or other configuration including a plurality of processors 1102 connected to system bus 1104. Alternatively, a single processor 1102 may be employed. Also connected to system bus 1104 is memory controller/cache 1106, which provides an interface to local memory 1108. An I/O bus bridge 1110 is connected to the system bus 1104 and provides an interface to an I/O bus 1112. The I/O bus may be utilized to support one or more buses and corresponding devices 1114, such as bus bridges, input output devices (I/O devices), storage, network adapters, etc. Network adapters may also be coupled to the system to enable the data processing system to become coupled to other data processing systems or remote printers or storage devices through intervening private or public networks.

Still further, the I/O bus may connect to devices such as a graphics adapter 1116, storage 1118 and a computer usable storage medium 1120 having computer usable program code embodied thereon. The processor(s) 1102 execute(s) computer usable program code to implement any aspect of the present invention, for example, to implement any aspect of any of the methods and/or system components illustrated in FIGS. 1-10. Through the above description of the embodiments, those skilled in the art will recognize that the above-mentioned system and method for providing dynamic help information can be practiced by executable instructions and/or controlling codes in processors, e.g., codes in mediums like disc, CD or DVD-ROM; memories like ROM or EPROM; and carriers like optical or electronic signal carrier. The system, apparatus and its units can be realized using hardware like Very Large Scale Integrated (VLSI) circuits or gate arrays, like semiconductors e.g., Logic Chip, transistors, etc., or like programmable hardware equipments e.g., Field Programmable Gate Arrays (FPGA), programmable logic equipment, etc.; or using software executed by different kinds of processors; or using the combination of said hardware and software.

The above-described exemplary embodiments are intended to be illustrative in all respects of the method and system for providing dynamic help information, rather than restrictive, of the present invention. Those skilled in the art should recognize that the present invention is capable of many variations and modifications within the scope and spirit of the present invention. The scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® ("Java" is a registered trademark of Oracle America, Inc. of Redwood Shores, Calif.), Smalltalk™ ("Smalltalk" is a trademark of Cincom Systems, Inc. of Cincinnati, Ohio, its subsidiaries, or successors), C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. An apparatus for providing help information, comprising:
a microprocessor coupled to a memory, wherein the microprocessor is programmed to obtain dynamic help to convey to a user of a browser on a client independent of code of a webpage of a web application for display on the client, by implementing:
a receiving unit that receives, from the client, at least one operation of a user and obtains an operation history associated with the user, wherein the operation history includes the at least one operation;

an operation capturing unit that identifies a web application with which the user is interacting;

a determining unit, on a server that includes code for the webpage of the web application to be displayed by the client, that determines appropriate help information based upon the obtained operation history and a current operation of the user by determining if a conflict exists between the current operation of the user and the at least one operation of the user from the user history and mapping a tuple indicating a scenario of the identified web application and step within the scenario to a tuple of help information selection and manner of display including a script; and an information obtaining unit that obtains the help information from a help repository that stores help information associated with the webpage.

2. The apparatus of claim 1, wherein:

said operation history comprises a current user status based at least in part on the current operation of the user, and said determining unit analyzes the current user status according to the operation history, and determines the corresponding help information according to said user status.

3. The apparatus of claim 2, wherein said determining unit maintains a mapping table, which stores the correspondence between each user status and the help information, and said determining unit determines the corresponding help information by referring to said mapping table.

4. The apparatus of claim 3, wherein said help information is stored by indexes or pointers in said mapping table.

5. The apparatus of claim 1, wherein said help repository comprises a help information storage apparatus, said information obtaining unit retrieves the corresponding help information from the help information storage apparatus and communicates the corresponding help information back to the client that requested the help information.

6. The apparatus of claim 1, wherein said help information contains description text and displaying information that is related to displaying the obtained help information and said displaying information contains displaying parameters, a pre-defined DIV library and a pre-defined software library.

7. The apparatus of claim 1 further including:

a setting unit that receives from a user, user settings with regard to the displaying of the help information and modifies the default settings of the received displaying information into the corresponding user settings, and sends the modified displaying information to the information displaying unit.

8. An apparatus for assisting in providing help information, comprising:

a microprocessor coupled to a memory, wherein the microprocessor is programmed to obtain and display dynamic help, which is conveyed to a user of a webpage of a web application by implementing:

an operation capturing unit that captures at least one operation of a user, identifying a web application with which the user is interacting, and sends the at least one operation to an analyzer to request help information, where the analyzer is independent of the webpage of the web application operated by a user; and an information displaying unit that receives and displays help information received from the analyzer, where the received help information is determined based upon an operation history associated with the user and a current operation of the user by determining if a conflict exists between the current operation of the user and the operation history and mapping a tuple indicating a scenario of the identified web application and step within the scenario to a tuple of help information selection and manner of display, wherein said operation history includes said at least one operation of the user interacting with the webpage, and wherein the help information is independent of the code executing the webpage.

9. The apparatus of claim 8, wherein said operation capturing unit captures said at least one operation by catching at least one of: mouse clicking, mouse dragging and keyboard inputting, performed by the user.

10. The apparatus of claim 8, wherein said operation capturing unit further records a plurality of operations of the user to form the operation history.

11. The apparatus of claim 10, wherein said operation capturing unit further sends said operation history to the analyzer for analysis to determine appropriate help information.

12. The apparatus of claim 8, wherein said help information includes description text and displaying information, and said information displaying unit displays said help information by inserting the code related to said displaying information into the source code of the current page.

13. A method for providing help information to a user, comprising:

receiving, from a client, at least one operation of a user interacting with a browser on the client and obtaining an operation history associated with the user, wherein the operation history includes the at least one operation;

identifying a web application with which the user is interacting;

determining, on a server including code for a webpage of the web application to be displayed on the client, appropriate help information based upon the operation history and a current operation of the user by determining if a conflict exists between the current operation of the user and the operation history and mapping a tuple indicating a scenario of the identified web application and step within the scenario to a tuple of help information selection and manner of display, wherein the help information is independent of code for the webpage, and wherein the help information includes a script;

obtaining the help information from a help repository that stores help information associated with the webpage, wherein the help information is provided to the user for display associated with the webpage; and sending the obtained help information to the client such that the client may inject the script as code into the code for display information of the webpage.

14. The method of claim 13, wherein said determining the corresponding help information comprises: analyzing a current user status according to the user's operation history and determining the corresponding help information according to said user status, wherein the current user status is based at least in part on the current operation of the user.

15. The method of claim 14, wherein said determining the corresponding help information according to user status comprises referring to a mapping table to determine the corresponding help information, said mapping table storing the correspondence between each user status and the help information.

16. The method of claim 15, further comprising storing said help information by indexes or pointers in said mapping table.

17. The method according to claim 13, wherein said help information comprises description text and displaying information that is related to displaying the obtained help information and said displaying information contains displaying parameters, a pre-defined DIV library and a pre-defined software library.

18. The method of claim 13 further including:
receiving from a user, user settings with regard to the displaying of the help information; and
modifying the default settings of the received displaying information into the corresponding user settings.

19. A method for assisting in providing help information, comprising:
capturing at least one operation of a user;
identifying a web application with which the user is interacting;
sending the at least one operation to an analyzer, where the analyzer is independent of code executing a webpage of the web application operated by the user, to request help information associated with an interaction between the user and the webpage; and
receiving the help information from the analyzer, where the received help information corresponds to a determined conflict between a current operation of the user and an operation history associated with the user and mapping a tuple indicating a scenario of the identified web application and step within the scenario to a tuple of help information selection and manner of display, wherein said operation history includes said at least one operation of the user interacting with the webpage, and wherein the help information is independent of the code executing the webpage.

20. The method of claim 19, wherein said at least one operation is captured by catching at least one of mouse clicking, mouse dragging and keyboard inputting performed by the user.

21. The method of claim 19, wherein said help information includes description text and displaying information, and wherein the method further includes displaying said help information by inserting the code related to said displaying information into the source code of the current page.

22. The method of claim 19, further comprising recording a plurality of operations of the user to form the operation history.

23. The method of claim 22, further comprising sending said operation history to the analyzer for analysis to determine appropriate help information.

* * * * *